United States Patent
Bayard

[15] 3,637,271
[45] Jan. 25, 1972

[54] BEARING INTENDED TO SUPPORT A SHAFT CAPABLE OF ROTATING AT HIGH SPEEDS

[72] Inventor: Gaston Bayard, 6, Place Wilson, Toulouse (Haute Garonne), France

[22] Filed: Apr. 21, 1970

[21] Appl. No.: 30,371

[30] Foreign Application Priority Data

May 30, 1969 France......................6917772

[52] U.S. Cl.............................................308/187
[51] Int. Cl.............................................F16c 1/24
[58] Field of Search.........................308/187, 184, 236

[56] References Cited

UNITED STATES PATENTS

| | | | |
|---|---|---|---|
| 2,676,856 | 4/1954 | Kohse | 308/187 |
| 3,017,230 | 1/1962 | Meermans | 308/187 |
| 3,332,726 | 7/1967 | Cooper | 308/184 |

FOREIGN PATENTS OR APPLICATIONS

| | | | |
|---|---|---|---|
| 1,327,571 | 4/1963 | France | 308/187 |

Primary Examiner—Edgar W. Geoghegan
Assistant Examiner—Frank Susko
Attorney—Charles E. Baxley, Frank M. Nolan and Thomas E. Tate

[57] ABSTRACT

A bearing, especially of the ball, roller or needle type, for carrying a shaft adapted to rotate at high speeds of rotation, said bearing comprising an inner ring in contact with the shaft, an outer ring in contact with the bearing surface of a supporting member and at least one row of balls, rollers, needles or the like imprisoned in a cage, the bore of said inner ring and the diameter of said shaft being dimensioned in such manner as to maintain between said elements a radial clearance at least equal to the distance between the axis of inertia of the assembly of rotating parts and the geometric axis of said inner ring, while the diameter of said outer ring and the bore of the bearing surface of the supporting member are so dimensioned as to maintain between said elements a small radial clearance of the order of a few microns. The facing surfaces of the inner ring and the shaft and the outer ring and the bore of the supporting member are rendered fast for rotation with each other and the radial clearances may be filled with fluid under pressure.

3 Claims, 3 Drawing Figures

BEARING INTENDED TO SUPPORT A SHAFT CAPABLE OF ROTATING AT HIGH SPEEDS

The present invention relates to a bearing especially intended to support a shaft capable of rotating at high speeds. This bearing may be of the ball, roller, needle type, etc.; for the sake of simplicity, these bearings will be called ball bearings in the text which follows, but it is understood that the invention is applicable to all categories of roller bearings.

It is known that conventional ball bearings are constituted by an inner ring in contact with a shaft, an outer ring in contact with the bearing surface of the supporting member, and at least one row of balls imprisoned in a cage, At the time of assembly, the inner ring is fitted practically without clearance on the shaft so as to be radially fast with this shaft. Furthermore, this ring is wedged between two abutments which fix it laterally on the shaft. In addition, the outer ring of the bearing is mounted in the bore of the supporting member with a very small clearance introducing sufficient coefficient of friction so that the ring is not driven in rotation; such rotation would result in wear and would even give rise to possibility of seizure of the ring in its housing.

It will be understood that in this assembly, the rotating parts are compelled to rotate about the geometric axis defined by the line of centers of the inner rings of the bearings on which these parts are mounted.

It is known, furthermore, that an assembly rotating at high speed will, if it is not restrained, rotate naturally about its axis of inertia. If on the other hand this assembly is compelled to rotate about an axis which is not coincident with its axis of inertia, this results in high loads on the bearings and considerable vibration extremely harmful to the life of these bearings. These loads result on the one hand from the residual out-of-balance weight and on the other hand from the inevitable displacement of the line of centers of the bearings from the geometric axis of the shaft, and finally from deformations of the rotating parts under the action of centrifugal forces and temperature.

Devices have already been proposed for attenuating the transmission of these loads to the fixed supporting member. One of these devices for example employs a bearing assembly comprising an outer ring spaced apart by an interstice from the fixed supporting member; this interstice contains a film of hydrodynamic oil. Arrangements of this kind effectively enable the loads transmitted to the fixed member to be reduced, but on the one hand these loads are only attenuated and not eliminated, and on the other hand the loads to which the bearings are subjected are not modified. It will further be noted that in these arrangements, the outer ring is subjected to a hypocycloidal movement in the supporting member.

The present invention is intended to eliminate the loads and vibrations which are applied both to the bearing and to the fixed supporting member. To this end, a ball bearing, constituted by an inner ring in contact with a shaft, an outer ring in contact with the bearing surface of a supporting member, and at least one row of balls imprisoned in a cage, is characterized in that:

On the one hand, the bore of the inner ring and the diameter of the shaft are dimensioned so as to preserve, between this pair of surfaces, a radial clearance greater than or equal to the distance of the axis of inertia of the assembly of the moving parts from the geometric axis of the inner ring about which the rotation is effected;

on the other hand, the facing surfaces of this shaft and this inner ring comprise means for fixing in rotation.

The radical clearance thus provided gives the moving parts freedom to rotate about their axis of inertia which comes naturally into coincidence with the geometric axis of the inner ring of the bearing, or more exactly with the geometric axis defined by the line of centers of the bearings on which these parts are mounted (since a rotating assembly is of course mounted on at least two bearings.)

At a constant speed of rotation, when once the axis of inertia of the shaft and of the rotating assembly has become coincident with the geometric axis of the inner ring (or inner rings,) shaft and this inner ring take up definite relative positions and remain fixed with respect to each other; there is no relative displacement of this shaft with respect to this inner ring, but only rotation of the assembly comprising the shaft, rotating parts, inner ring, about the geometric axis of the inner ring, with which, as indicated above, the axis of inertia of the rotating assembly is coincident. In consequence, once this axis of inertia and this geometric axis have become coincident, everything takes place at constant speed, as if the inner ring were rigidly fixed to the shaft in a position such that the above-mentioned axis of inertia and geometric axis are in coincidence.

Such an automatic balancing eliminates any out-of-balance phenomena and any tendency to vibrate, whatever the speed of rotation of the shaft may be; the wear of the ball bearings is thus substantially reduced and their life is increased in a considerable proportion, attaining up to 10 times the period of life of conventional ball bearings.

It should be noted that since the inner ring and the shaft remain stationary with respect to each other, there is no fear of wear of the surfaces of these parts.

It is important to observe that, as has already been indicated, the conventional devices do not eliminate the unbalanced loads, since with these devices the axis of inertia of the rotating parts always remains distinct from the geometric axis about which the rotation is effected; these devices simply permit the transmission of these out-of-balance loads to the supporting member (or fixed frame) to be attenuated. It is thus easy to understand the advantage of the present invention which is shown to be of an entirely different nature: as balancing is achieved, the out-of-balance loads are purely and simply eliminated and no stresses due to an unbalance effect are applied on the bearing and on the supporting member.

It will furthermore be understood that the means provided for fixing together for rotation are intended to make the inner ring fast for rotation with its shaft and to eliminate any possibility of relative angular displacement between these two parts.

In addition, and in an accessory manner, a small radial clearance may also be provided between the outer ring and the bearing surface of the supporting member, these surfaces comprising means for fixing them together for rotation. These arrangements are only intended to permit, irrespective of the differential expansions of the outer ring and the supporting member, a longitudinal displacement of the bearing in its supporting member. In addition, in the case of a plurality of bearings in line, the mounting will thereby be greatly facilitated.

According to a preferred method of construction, the means for fixing together in rotation of the shaft and the inner ring and also, if so required, the outer ring and the bearing surface of the supporting member, consist of longitudinal splines or teeth formed in these surfaces. The radial clearance provided between the inner ring and the member may advantageously be of the order of 10 to 20 microns. In fact, modern machining equipment makes it possible to balance the rotating parts in such manner that the distance between their axis of inertia and the geometric axis of rotation is less than that value.

The radial clearance comprised on the one hand between the inner ring and the surface of the shaft and on the other hand when so required, between the outer ring and the bearing surface of the supporting member is preferably filled with a fluid under pressure, in particular oil. This fluid makes it possible to damp the radial movements of the bearing during changes in working conditions and to eliminate wear due to relative displacement which could ultimately be caused by these movements.

The invention also concerns the application of bearings such as previously described for the mounting of a shaft on which is fixed an assembly rotating at high speed such as a shaft of a turbine and compressor in a gas turbine. According to the invention, at least two bearings are provided and each is mounted with a lateral play between two abutments and is laterally urged towards one of these abutments by elastic means.

This structure enables the assembly to withstand, without risk of excessive wear of the bearings, the longitudinal forces which are liable to be applied on the shaft.

The description which follows with reference to the accompanying drawings refers, by way of nonlimitative example, to one form of embodiment of the invention. In the drawings.

Figure 1:
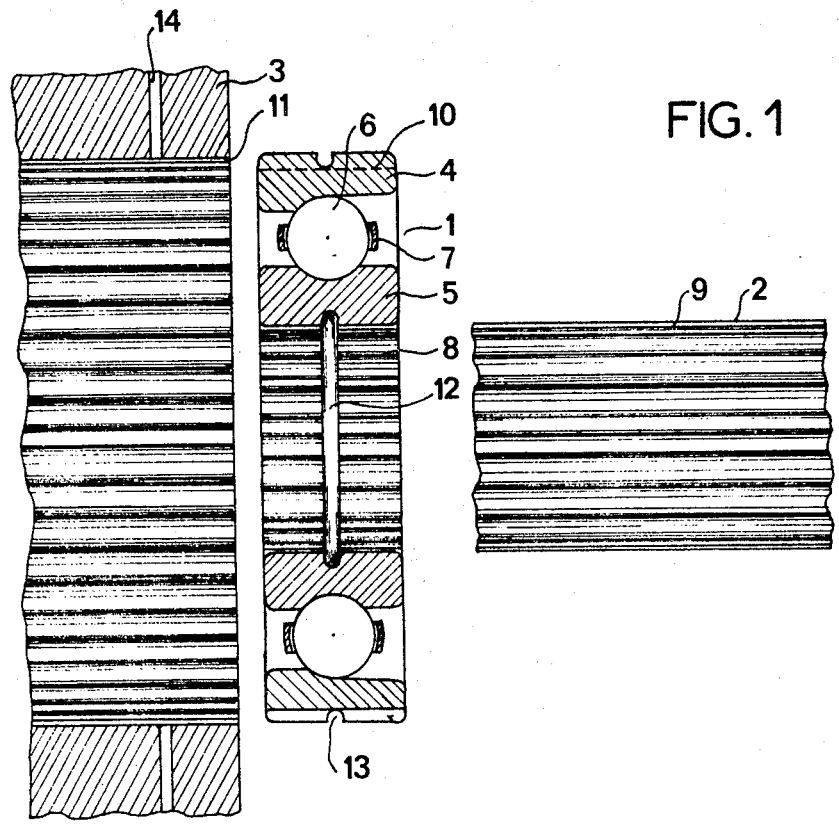
FIG. 1 shows in cross section a shaft, a ball bearing according to the invention, and the bearing surface of a supporting member.
Figure 2:
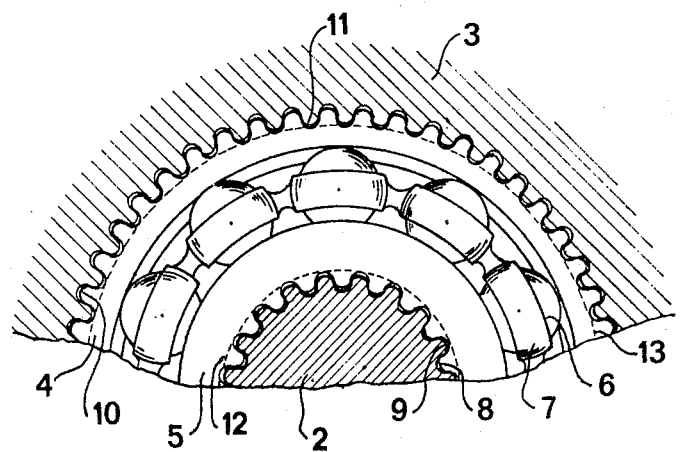
FIG. 2 is a view to an enlarged scale of a bearing mounted on a shaft and bearing against a supporting member.

A ball bearing 1 (FIGS. 1 and 2) having, in the example shown, a conical rolling track and being intended to permit rotation without substantial friction of a shaft 2 in a supporting member shown diagrammatically at 3, is constituted by an outer ring 4, an inner ring 5 and a row of balls such as 6 which are typical of roller elements such as balls, rollers or needles.) imprisoned in a cage 7.

On its inner wall, the inner ring 5 is provided with splines 8 intended to be associated with splines 9 provided on the surface of the shaft 2. The profile of these splines may be in the form of an involute of a circle. The size of these splines has been greatly exaggerated in the drawings for the purpose of making these clearer.

The outer ring 4 is also provided with splines 10 intended to cooperate with splines 11 provided on the bearing surface of the supporting member 3.

The surfaces of the splines of the inner ring and the shaft are adapted with a play of the order of 10 microns, which gives the axis of inertia of the rotating parts the necessary freedom to become coincident with the geometric axis of rotation, thereby avoiding any out-of-balance effect.

In addition, grooves 12 and 13 are respectively formed in the inner surface of inner ring 5 and on the outer surface of the outer ring 4 in order to permit a circulation of oil filling the free spaces, on the one hand between the inner ring and the shaft and on the other hand between the outer ring and the supporting member, resulting from the existence of the above-mentioned clearance or play.

Channels (not shown) formed in the shaft 2 and in the supporting member 3 (shown diagrammatically at 14,) canalize this oil circulation towards these spaces. This fluid makes it possible to reduce to a negligible value the wear in the bearing produced on the one hand between the shaft and the inner ring and by the radical movements during changes in working conditions, and on the other hand between the outer ring and the supporting member by longitudinal displacements of the bearing.

There has therefore been produced a ball bearing which enables the rotating parts to rotate about their axis of inertia whatever the speed of rotation may be.

Figure 3:
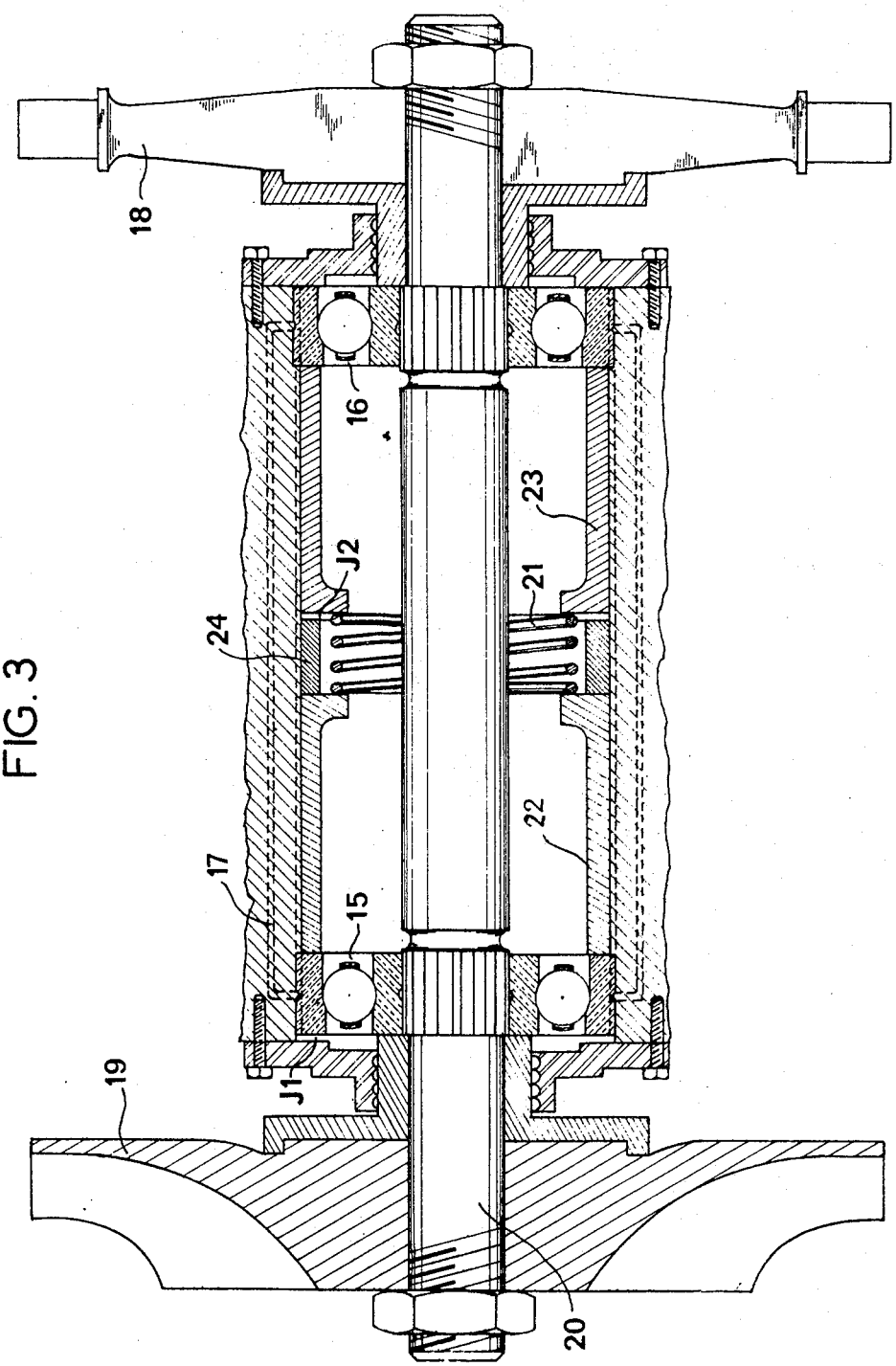
FIG. 3 is a diagrammatic view of the bearings according to the invention, mounted in a gas turbine.

This bearing is especially advantageous for high speeds of rotation, for example in the case shown diagrammatically in FIG. 3 of a gas turbine.

In this figure, there are again seen at 15 and 16 ball bearings according to the invention, and at 17 an inlet channel for oil under pressure into the groove of their outer rings.

In addition, there are also shown diagrammatically the conventional elements of a gas turbine, such as a turbine wheel 18 and a compressor wheel 19 mounted on a shaft 20, a spring 21 acting through the intermediary of the parts 22 and 23 on the outer rings of the bearings.

A fixed abutment 24 limits the displacement of the parts 22 and 23 and in consequence of the bearings 15 and 16. The positions of the various parts of FIG. 3 assumes that a longitudinal force in the direction of the compressor wheel 19 towards the turbine wheel 18 is applied on the shaft 20; the lateral clearance provided in the mounting of the bearings is again shown at $j_1$ for the bearing 15 and at $j_2$ for the bearing 16.

This arrangement enables the said longitudinal forces to be absorbed without excessive wear of the bearings.

The present description is of course not in any way intended to limit the scope of the invention, which is on the contrary widened to include all the alternative forms and improvements within the scope of those skilled in the art. In particular, as has already been stated, the invention is applicable to all categories of roller bearings: of the ball, roller, needle types, etc.

What I claim is:

1. A bearing carrying in a supporting member a shaft rotatable at high speeds, the bearing comprising an inner ring, the supporting member having a bearing surface, an outer ring in contact with said bearing surface, a row of roll elements between the inner and outer rings and imprisoned in a cage, the shaft and the inner ring comprising a rotatable assembly; the bearing further characterized by:

the inner ring having a bore and the shaft having a periphery both dimensioned to provide therebetween a radial clearance at least equal to the distance between he axis of inertia of said rotating assembly and the geometric axis of the inner ring about which the rotation is effectable to substantially eliminate imbalancing forces when the shaft is rotated at high speeds said bore and said periphery provided with means for making them fast each to the other for conjoined rotation of the inner ring with the shaft, means for introducing pressurized fluid to said radial clearance.

2. The bearing of claim 1 with said means for making the shaft and the inner ring fast each to the other for conjoined rotation comprising axial splines formed on both said bore and said periphery.

3. The bearing of claim 3 with the radial clearance between the inner ring and the shaft from 10 to 20 microns.

* * * * *